United States Patent [19]

Gilbert et al.

[11] Patent Number: 4,489,143
[45] Date of Patent: Dec. 18, 1984

[54] LITHIUM ALUMINUM/IRON SULFIDE BATTERY HAVING LITHIUM ALUMINUM AND SILICON AS NEGATIVE ELECTRODE

[75] Inventors: Marian Gilbert, Flossmoor; Thomas D. Kaun, New Lenox, both of Ill.

[73] Assignee: The United States of America as represented by the United States Department of Energy, Washington, D.C.

[21] Appl. No.: 572,345

[22] Filed: Jan. 20, 1984

[51] Int. Cl.³ .............................................. H01M 4/36
[52] U.S. Cl. .................................. 429/103; 429/112; 429/199; 429/218; 29/623.1; 252/182.1
[58] Field of Search ............... 429/103, 199, 218, 112; 252/182.1, 500; 29/623.1; 75/68 R, 122.1

[56] References Cited

U.S. PATENT DOCUMENTS 4,358,513 11/1982 Kaun .................................. 429/103

OTHER PUBLICATIONS

ANL-81-65 (Progress Report Oct. 1980–Sep. 1981), p. 16.
Electrochem. Soc., Oct. 1981, Extended Abs., vol. 81-2, Abs. 590, pp. 1416–1418.

Primary Examiner—Charles F. LeFevour
Attorney, Agent, or Firm—Hugh W. Glenn; Robert J. Fisher

[57] ABSTRACT

A method of making a negative electrode, the electrode made thereby and a secondary electrochemical cell using the electrode. Silicon powder is mixed with powdered electroactive material, such as the lithium-aluminum eutectic, to provide an improved electrode and cell.

20 Claims, 7 Drawing Figures

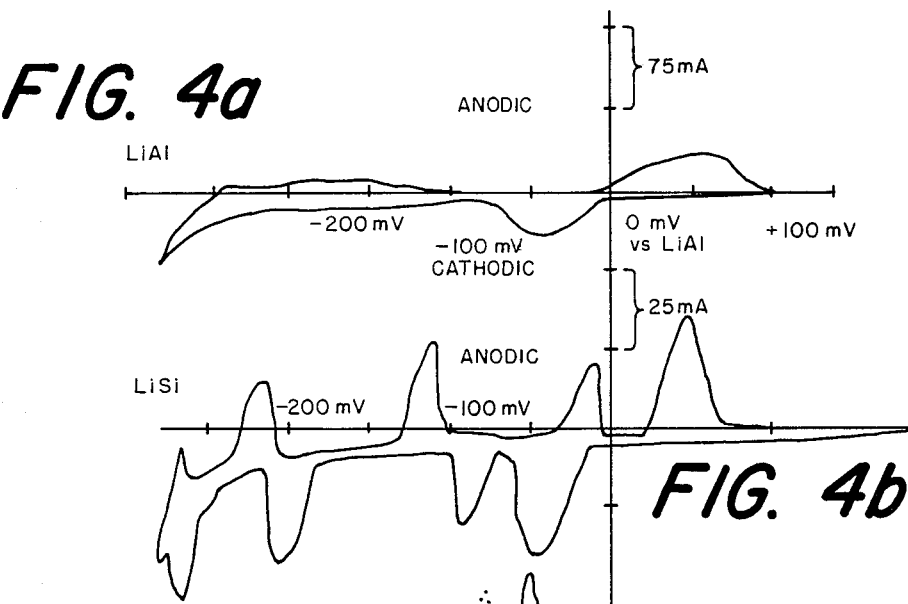
FIG. 4a
FIG. 4b
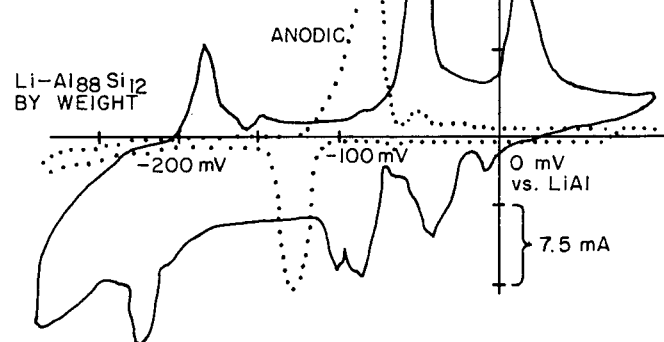
FIG. 4c
····· LiAl + Si POWDER ADDITION
Al:Si RATIO EQUIVALENT TO THAT
OF AlSi ALLOY

LITHIUM ALUMINUM/IRON SULFIDE BATTERY HAVING LITHIUM ALUMINUM AND SILICON AS NEGATIVE ELECTRODE

CONTRACTURAL ORIGIN OF THE INVENTION

The United States Government has rights in this invention pursuant to Contract No. W-31-109-ENG-38 between the U.S. Department of Energy and Argonne National Laboratory.

BACKGROUND OF THE INVENTION

The present invention relates to electrodes for use in secondary electrochemical cells. More particularly, it concerns a method of making a negative electrode composition and electrode composition made thereby wherein the negative electrode composition includes a lithium-aluminum alloy with a silicon additive.

A substantial amount of work has been done in the development of high-temperature, secondary electrochemical cells. Positive electrodes for the cells have included chalcogens such as sulfur, oxygen, selenium or tellurium as well as their transition metal chalcogenides. Positive electrode materials such as the sulfides of iron, cobalt, nickel and copper are of current interest.

In high-temperature cells, current flow between electrodes often is transmitted by molten electrolytic salt. Particularly useful salts include compositions of the alkali metal halides and/or the alkaline earth metal halides ordinarily incorporating a salt of the negative electrode reactant metal, e.g. lithium. In cells operating at moderate temperatures, aqueous and organic base electrolytes are permissible and these also can include cations of the negative electrode metal.

Alkali metals such as lithium, sodium, potassium or alkaline earth metals including calcium, magnesium, etc. and alloys of these materials are contemplated as negative electrode reactants. Alloys of these materials such as lithium-aluminum, lithium-silicon, lithium-magnesium, calcium-magnesium, calcium-aluminum, calcium-silicon and magnesium-aluminum have been investigated to maintain the negative electrode in solid form and thereby improve retention of the active material at high cell operating temperatures.

One of the areas in the secondary electrochemical cells in which improvement is always required, no matter how small, is in obtaining a higher output voltage of the cell and in obtaining a relatively constant power output during discharge. The present invention was unexpectedly discovered to provide not only improved output voltage, but also to provide a relatively constant power output during discharge.

SUMMARY OF THE INVENTION

It is an object of the present invention to provide a method of making a negative electrode and an electrode made thereby for use in a secondary electrochemical cell and a cell incorporating such electrode.

It is a further object to provide a mixture of a particulate lithium-aluminum alloy and particulate silicon for use in a negative electrode which exhibits increased output voltage when placed in a secondary electrochemical cell while providing a relatively constant output voltage during cell discharge.

In accordance with the present invention, a negative electrode comprises a particulate mixture of a lithium-aluminum alloy and silicon.

In a more specific aspect of the present invention, a negative electrode includes a lithium-aluminum alloy containing lithium in the range of from about 5 to about 50 atom percent and aluminum in the range of from about 95 to about 50 atom percent and silicon up to about 20% by weight of the aluminum.

In yet another aspect of the invention, a method of making a negative electrode includes mixing lithium-aluminum alloy particles and silicon particles wherein the silicon is present in an amount not greater than about 20% by weight of the aluminum, and forming the mixture into an electrode.

In a further aspect of the invention, the secondary electrochemical cell has a positive electrode and a negative electrode and an electrolyte, the positive electrode comprises an active material of a chalcogen or a transition metal chalcogen, the negative electrode comprises a particulate mixture of a lithium-aluminum alloy and silicon, and the electrolyte contains lithium ions providing ionic communication between the positive and the negative electrodes.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DESCRIPTION OF THE FIGURES

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 4 is a graph of the cyclic voltagrams of four negative electrodes; and

DETAILED DESCRIPTION OF THE INVENTION

Figure 1:
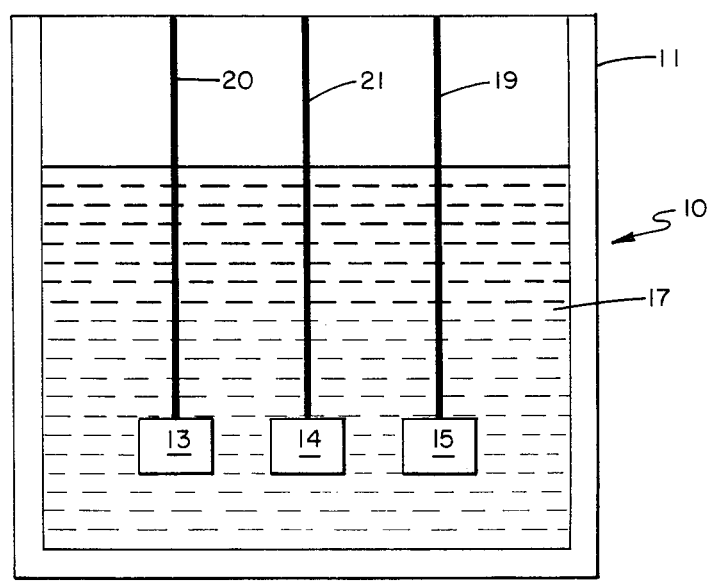
FIG. 1 is a schematic illustration of an electrochemical cell that can be used in testing the electrode composition of the invention.

The improved method and electrode made thereby and electrochemical cell of the invention is particularly useful with a iron sulfide positive electrode and a lithium-aluminum alloy to which is added silicon as the negative electrode. The preferred electrolyte is the eutectic of lithium chloride and potassium chloride.

Lithium in the range of about 5 to about 50 atom percent is added by direct contact or by electro-deposition into the aluminum to form the lithium-aluminum alloy. The lithium concentration is limited by its propensity to form molten phases with the alloy components at high temperatures and at high lithium concentrations. Fifty atom percent lithium is selected as a practical limit for cells operating in the 350° C. to 550° C. temperature range suitable for molten electrolytes. Higher lithium concentrations may be selected for cells capable of operating at lower temperatures such as with molten salt eutectics having low melting points or with aqueous or organic-based electrolytes containing lithium ions.

In the past, negative electrode materials were prepared by various metallurgical techniques such as that disclosed in U.S. Pat. No. 4,158,720 issued June 19, 1979, assigned to the assignee of the present invention, the disclosure of which is incorporated herein by reference. In that patent, the negative electrode was prepared by forming a molten alloy of iron and aluminum. The melt was formed at a temperature above the melting point of aluminum but below the melting point of iron. For the alloys contemplated in that patent, temperatures of 1200° C. or above were satisfactory. The melt was solidified and comminuted to particles of aluminum-iron alloy in the specified proportions. Thereafter, the alloy particles were integrated into a porous, electrically conductive substrate. This was achieved by compacting the particles together with a powdered electrolyte by vibrating or otherwise distributing the particles into a porous electrically conductive substrate or by bonding the particles with a combination of thermosetting material to form a porous electrically conductive substrate. Other metallurgical techniques such as casting or extruding are also discussed.

Another method of making the negative electrode of this invention involves forming a slurry of the lithium-aluminum and silicon particles in a carrier inert to lithium alloys such as dry petroleum ether, toluene, kerosene, or the like such that the resultant slurry is a spreadable and extrudable paste. The preferred amount of organic carrier is about 30 percent by volume; however, the carrier may be present in an amount up to 50 volume percent or be as low as 10 volume percent, depending on particle size and desired viscosity.

If the inert carrier is present in an amount greater than 50 volume percent, then the slurry becomes too runny and does not retain its shape upon extrusion and also the amount of heat required to drive off the solvent is greater and handling costs are greater. On the other hand, if less than about 10 percent by volume inert carrier is used to form the slurry, then the close packing and protective nature of the carrier is not obtained, and the method is not advantageous.

By selecting an inert carrier such as petroleum based liquids such as toluene, kerosene, mineral spirits and the like, several benefits are obtained, as disclosed in U.S. Pat. No. 4,358,513 issued Nov. 9, 1982, assigned to the assignee of the present invention, the disclosure of which is herein incorporated by reference. As disclosed in the '513 patent, with the slurry, a closer particle packing density is obtained when compared to dry powder packing, the method most commonly used to fabricate electrodes of the present type. Because the lithium-aluminum alloy particles are irregularly shaped and the carrier apparently provides some lubricating properties, the lithium-aluminum particles pack more densely than dry powder packing. Typically, lithium-aluminum dry packing results in 50 percent of theoretical density to give a loading density of about 0.7 amp-hours/cc which is marginal for producing high-specific-energy cells.

The aforesaid inert hydrocarbon slurry technique enables a 0.9 amp-hour/cc loading density even with the additional silicon particles which is well suited for high-specific-energy cells. This technique gives loading densities about equal to the cold pressed lithium-aluminum electrode loading densities.

Referring now to FIG. 1 of the drawings, there is illustrated an electrochemical cell 10 that schematically illustrates a cell suitable for testing electrodes of the present type, the cell 10 being substantially of the type illustrated in U.S. Pat. No. 4,011,374 issued Mar. 8, 1977 assigned to the assignee of this application, the disclosure of which is incorporated herein by reference. Although the cell 10 is schematic in nature, it will be understood that cells of this general type may be used in layered configuration or the like, all as well known in the art, the cell 10 includes a non-conductive exterior housing 11, a plurality of negative electrodes 13, 14 and a positive electrode 15 separated by molten electrolyte 17. Electrode conductors 19, 20 and 21 respectively extend from the positive electrode 15 and the negative electrodes 13, 14.

A test cell is constructed which was similar to that illustrated in FIG. 1; however, either two or three negative electrodes were provided depending on the types of measurements to be obtained and the number of negative electrodes to be compared.

At least four different electrode compositions were formulated and compared using a device similar to test cell 10. One of the electrode compositions was a traditional negative electrode of 49 atom percent lithium in the lithium-aluminum alloy, the alloy being present in an amount equal to 87 percent by volume of the negative electrode with the remaining 13 percent being electrolyte which was the lithium chloride-potassium chloride eutectic. Another of the negative electrode compositions was prepared by electrochemically charging lithium into particles of an aluminum-silicon eutectic to provide a negative electrode alloy denoted as Li-$Al_{88}Si_{12}$, wherein lithium was charged in substantially the same amount as in the lithium-aluminum electrode. Two additional negative electrodes were prepared using particles of a lithium-aluminum alloy and particles of silicon. The ratio of silicon and aluminum in one of these two negative electrodes was identical to the lithium and aluminum-silicon eutectic electrode, that is about 12 percent by weight of the aluminum present, and the other had more silicon such that the silicon was present in an amount of about 20 percent by weight of the aluminum.

The novel electrodes of the present invention, these being the electrodes wherein the lithium-aluminum alloy particles are mixed with silicon particles, such that the silicon particles are present in an amount up to about 20 percent by weight of the aluminum and may be present from somewhat less than about 12 percent by weight to about 20 percent by weight of the aluminum, may be made by any of the methods previously discussed. Specifically, the novel electrodes of the present invention may be made by mixing the lithium-aluminum powder with the silicon powder and thereafter cold pressing the electrodes into the desired shape as is known. Also, the slurry method previously described is also useful for the electrodes of the present invention in which the particulate electrode active material is formed into a slurry with an inert carrier of the type previously disclosed. As stated before, the advantages of this technique are in providing negative electrodes in wider variety of shapes than is possible with cold pressing, while retaining the same loading density. It is also clear that the negative electrodes of the present invention may be formulated with or without the presence of electrolyte, but in electrochemical cells of the type herein discussed, electrolyte is usually present in the range of from about 10 percent by volume to about 20 percent by volume of the negative electrode.

Figure 2:
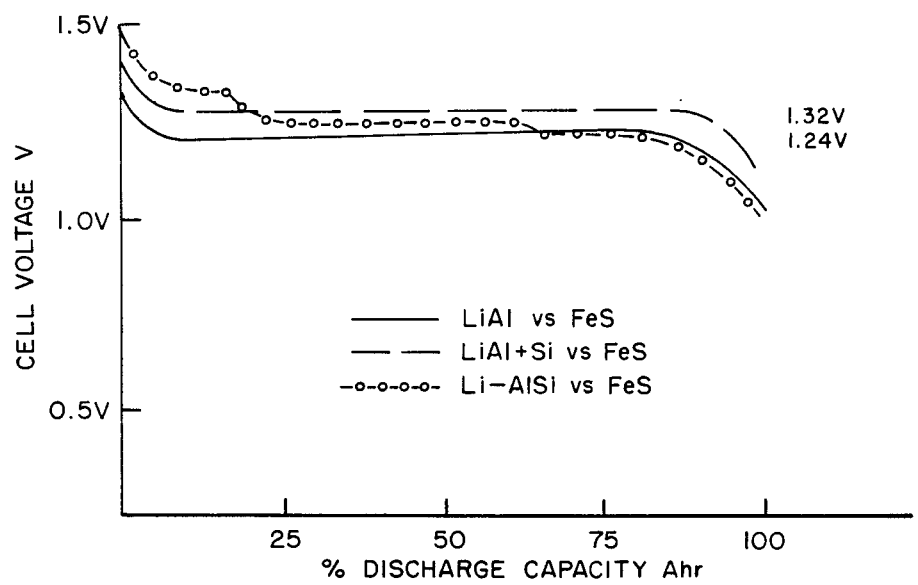
FIG. 2 is a graph showing the relationship between cell voltage and percent discharge capacity in amps hours for several negative electrodes.

Referring now to FIGS. 2-5, the various negative electrodes are compared to each other to illustrate the advantages of the inventive electrodes. FIG. 2, shows that the negative electrode made by physically mixing lithium-aluminum alloy particles and silicon particles has a significantly higher cell voltage than did the other two electrodes, 1.32 volts versus 1.24 volts. The inventive electrode here tested (dashed line) had silicon in the same weight percentage as did the electrode using the aluminum-silicon alloy (interconnected dotted line). Further, the cell voltage of 1.32 volts for the inventive electrode was constant over a longer percent of discharge than either the other two cells using the negative electrodes. This is important not only because of the increase in power produced by the cell using the inventive electrode but the power remains more constant during a greater percent of the cell life.

Figure 3:
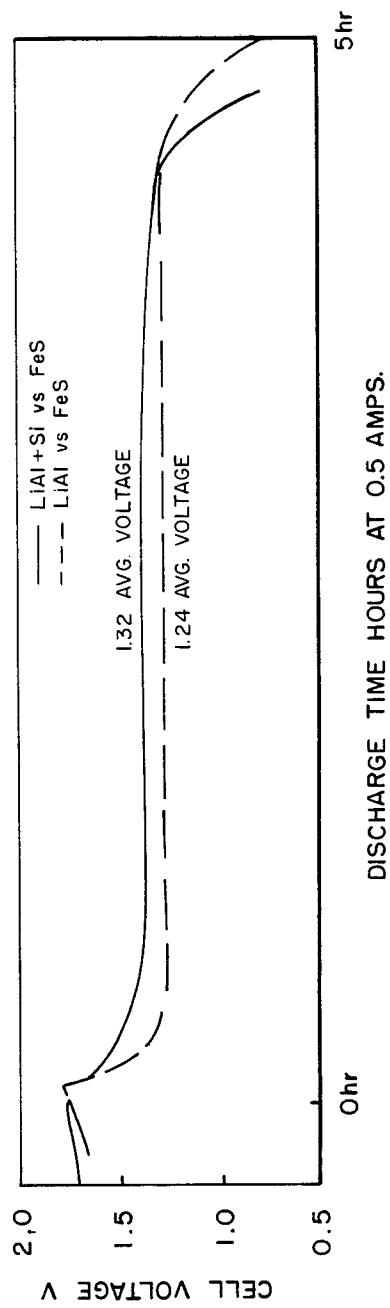
FIG. 3 is a graph showing the relationship between the cell voltage and the discharge time in hours at 0.5 amps for two negative electrodes.

FIG. 3 shows a comparison of voltage and capacity of a conventional electrochemical cell having a negative lithium-aluminum electrode and a positive iron sulfide electrode and an electrochemical cell having a negative electrode fabricated with the method of the present invention involving a mixture of lithium-aluminum alloy particles and silicon particles and a positive iron sulfide electrode. Both cells tested included 4 amp hours of lithium electrode activity versus 20 amp hours of iron sulfide electricity to ensure that differences in performance were due to the negative electrodes. The solid line curve shows an output voltage of 1.32 volts for the cell using the inventive negative electrode versus an output voltage of 1.24 volts for the cell using the lithium-aluminum negative electrode. The improvement in output voltage of 10-20% demonstrates the improvement of the subject negative electrode.

FIG. 4 compares the cyclic voltammograms at a scan rate of 0.15 mV/sec. for four different lithium containing negative electrodes, (a) a lithium-aluminum alloy, (b) a lithium-silicon alloy and (c) lithium in an aluminum-silicon alloy, the solid line curve, and lithium-aluminum alloy with silicon powder physically added thereto, the broken line curve. In both electrodes shown in part (C) of FIG. 4, the weight ratio of silicon to aluminum was identical as about 12%. FIG. 4 shows the electrode material lithium-aluminum alloy referenced to itself in part (a) and lithium-silicon alloy referenced to lithium-aluminum alloy in part (b). A blended alloy lithium-aluminum 88 silicon 12 alloy referenced to lithium-aluminum alloy in part (c), the solid line curve and the inventive electrode of lithium-aluminum alloy mixed with silicon powder referenced to a lithium-aluminum alloy as the dotted line curve in part (c). The basic lithium-aluminum alloy versus lithium-aluminum alloy curve shows distinctive positive and negative charging and discharging peaks located almost symmetrically about the 0 value. The lithium-silicon alloy versus the lithium-aluminum alloy curve has four characteristic peaks on the discharging side and four characteristic peaks on the charging side. The lithium with aluminum-silicon alloy versus lithium-aluminum alloy provides somewhat of a composite of the previous two electrodes where the same major charging and discharging peaks are present.

Lithium-aluminum 88 and silicon 12 is a eutectic alloy so that even upon fracturing to powder, each granule has the corresponding ratio of elements likewise lithium-aluminum is a compound so that each fractured granule has the stated percentage of element. The dotted line curve in part (c) of FIG. 4 shows the results of the inventive electrode referenced against lithium-aluminum alloy. This curve shows a two peak charge-discharge shifted to approximate symmetry to about −80 mV value. This results in a larger discharge voltage relative to the iron sulfide positive electrode to 1.4 volts. Further, the double peak configuration provides a favorable high output characteristic discharging voltage without steps or plateaus over an extended period of the discharge curve. In contrast, the negative electrode alloy lithium-aluminum 88 silicon 12 against the same iron sulfide positive electrode has four voltage plateaus between approximately 1.5 volts and 1.25 volts corresponding to each anodic peak 1-4.

Figure 5:
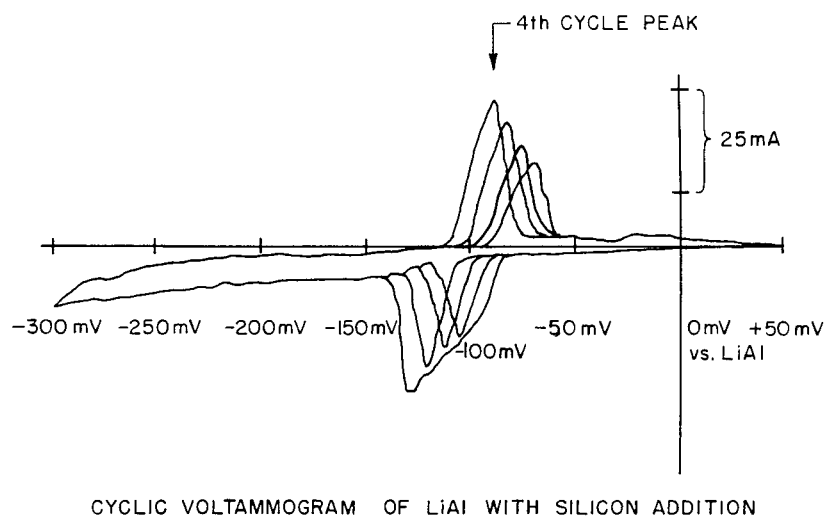
FIG. 5 is a graph of four cyclic voltagrams showing the effect on lithium capacity by repeated cycling.

FIG. 5 illustrates four cyclic voltammograms at a scan rate of 0.015 mV/sec. for the negative electrode represented by the dotted line in part (c) of FIG. 4, this shows the improved voltage relative to the lithium aluminum electrode and also shows that as the electrode is cycled the potential peak migrates negatively with respect to the lithium-aluminum electrode to a minus 80 mV value. The graph also shows that with each successive cycle the capacity of the electrode increased.

The data clearly show that the negative electrode of the present invention provides an increased output voltage and higher power over longer percent of the cell discharge than previous negative electrodes when compared to the same positive electrode. This result was surprising in view of the previous work with negative electrodes made of the lithium aluminum-silicon eutectic which did not show any significant improvement with respect to the well known lithium-aluminum negative electrode. The present invention provides both a method of making an improved negative electrode and the negative electrode thereby. Further, an electrochemical cell using the improved electrode is also contemplated herein.

While there has been disclosed what at present is considered to be the preferred embodiment of the present invention, it will be understood that various modifications and alterations may be made therein without departing from the true spirit and scope of the present invention, and it is intended to cover within the claims appended hereto all such alterations, variations and modifications.

The embodiments of the invention in which an exclusive property or privilege is claimed are defined as follows:

1. A negative electrode comprising a formed particulate mixture of a lithium-aluminum alloy and silicon.

2. The negative elelctrode of claim 1, wherein said lithium-aluminum alloy contains lithium in the range of from about 5 to about 50 atom percent and aluminum in the range of from about 95 to about 50 atom percent.

3. The negative electrode of claim 1, and further comprising a lithium ion-containing electrolyte present in the amount of up to about 20 volume percent of said negative electrode.

4. The negative electrode of claim 3, wherein said electrolyte is present in the range of from about 10% by volume to about 20% by volume of the negative electrode.

5. The negative electrode of claim 3, wherein said electrolyte is a eutectic mixture of lithium chloride and potassium chloride.

6. The negative electrode of claim 1, wherein said silicon is present in an amount not greater than about 20% by weight of the aluminum.

7. The negative electrode of claim 1, wherein said silicon is present in an amount not less than about 12% by weight of the aluminum.

8. A method of making a negative electrode comprising mixing lithium-aluminum alloy particles and silicon particles and forming the mixture into an electrode.

9. The method of claim 8, wherein said lithium-aluminum alloy contains lithium in the range of from about 5 to about 50 atom percent and aluminum in the range of from about 95 to about 50 atom percent.

10. The method of claim 8, wherein up to about 20 volume percent of a lithium-ion containing electrolyte is mixed with the lithium-aluminum alloy particles and the silicon particles during formation of the negative electrode.

11. The method of claim 10, wherein the electrolyte is present in the negative electrode in the range of from about 10% by volume to about 20% by volume of the electrode.

12. The method of claim 8, wherein the silicon is present in an amount not greater than about 20% by weight of the aluminum.

13. The method of claim 8, wherein the silicon is present in a range of from about 12% by weight of the aluminum to about 20% by weight of the aluminum.

14. The method of claim 8, wherein the lithium-aluminum particles and the silicon particles are formed into a slurry in a carrier inert to lithium alloys and silicon wherein the carrier is present in the range of from about 10% by volume to about 50% by volume of the dry particles and thereafter forming the slurry into the desired electrode shape and evaporating the carrier.

15. The method of claim 14, wherein the slurry is a paste which is spreadable or extrudable into the desired electrode form.

16. A secondary electrochemical cell having a positive electrode and a negative electrode and an electrolyte, said positive electrode comprising an active material of a chalcogen or a transition metal chalcogen, said negative electrode comprising a formed particulate mixture of a lithium-aluminum alloy and silicon, and said electrolyte containing lithium ions providing ionic communication between said positive and negative electrodes.

17. The cell of claim 16, wherein said positive electrode contains iron sulfide and said lithium-aluminum alloy of said negative electrode contains lithium in the range of from about 5 to about 50 atom percent and aluminum in the range of from about 95 to about 50 atom percent and said electrolyte is the eutectic of lithium chloride and potassium chloride.

18. The cell of claim 17, wherein said negative electrode contains electrolyte in an amount not less than about 10 volume percent of the negative electrode.

19. The cell of claim 18, wherein said negative electrode contains silicon in an amount up to about 20% by weight of the aluminum.

20. The cell of claim 18, wherein said negative electrode contains silicon in the range of from about 12% by weight of the aluminum to about 20% by weight of the aluminum.

* * * * *